US012424625B2

(12) United States Patent
Mahbub et al.

(10) Patent No.: US 12,424,625 B2
(45) Date of Patent: Sep. 23, 2025

(54) STABLE LITHIUM METAL SULFIDE COATINGS FOR SOLID-STATE BATTERIES

(71) Applicant: Rivian IP Holdings, LLC, Irvine, CA (US)

(72) Inventors: Rubayyat Mahbub, Palo Alto, CA (US); Muratahan Aykol, San Jose, CA (US); Terri Lin, Fremont, CA (US); Karthik Bhatt, San Jose, CA (US); Forrest Gittleson, Mountain View, CA (US)

(73) Assignee: Rivian IP Holdings, LLC

( * ) Notice: Subject to any disclaimer, the term of this patent is extended or adjusted under 35 U.S.C. 154(b) by 588 days.

(21) Appl. No.: 17/744,998

(22) Filed: May 16, 2022

(65) Prior Publication Data

US 2023/0369586 A1    Nov. 16, 2023

(51) Int. Cl.

| | |
|---|---|
| H01M 4/58 | (2010.01) |
| H01M 4/36 | (2006.01) |
| H01M 4/66 | (2006.01) |
| H01M 10/0525 | (2010.01) |
| H01M 10/0562 | (2010.01) |
| H01M 4/02 | (2006.01) |

(52) U.S. Cl.
CPC ......... *H01M 4/5815* (2013.01); *H01M 4/366* (2013.01); *H01M 4/661* (2013.01); *H01M 10/0525* (2013.01); *H01M 10/0562* (2013.01); *H01M 2004/027* (2013.01); *H01M 2300/0068* (2013.01); *H01M 2300/0094* (2013.01)

(58) Field of Classification Search
CPC .... H01M 4/5815; H01M 4/366; H01M 4/661; H01M 10/0525; H01M 10/0562; H01M 2004/027; H01M 2300/0068

See application file for complete search history.

(56) References Cited

U.S. PATENT DOCUMENTS

| | | | |
|---|---|---|---|
| 2002/0018939 A1* | 2/2002 | Kugai | H01M 10/052 429/231.95 |
| 2007/0015060 A1* | 1/2007 | Klaassen | H01M 10/056 429/126 |
| 2011/0287292 A1* | 11/2011 | Suyama | H01M 50/403 429/94 |
| 2013/0004850 A1* | 1/2013 | Shon | H01G 11/46 428/221 |
| 2017/0018796 A1* | 1/2017 | Baek | B24C 11/00 |
| 2020/0161699 A1* | 5/2020 | Ito | C01G 53/50 |

FOREIGN PATENT DOCUMENTS

KR    2020-0046296 A    *    5/2020

OTHER PUBLICATIONS

EPO machine generated English translation of KR 2020-0046296 A (Year: 2020).*
Snydacker, David H., et al., 2017 J. Electrochem. Soc. 164 A3582.

* cited by examiner

*Primary Examiner* — Basia A Ridley
*Assistant Examiner* — Kimberly Wyluda
(74) *Attorney, Agent, or Firm* — FOLEY & LARDNER LLP

(57) ABSTRACT

An electrochemical cell includes a solid-state electrolyte, an anode, and an interfacial layer between the solid-state electrolyte and the anode, wherein the interfacial layer includes a lithium metal sulfide.

16 Claims, 9 Drawing Sheets

STABLE LITHIUM METAL SULFIDE COATINGS FOR SOLID-STATE BATTERIES

INTRODUCTION

The present technology is generally related to lithium rechargeable batteries. More particularly the technology relates to interfacial layers between anodes and solid-state electrolytes for secondary rechargeable batteries.

SUMMARY

In one aspect, an electrochemical cell includes a solid-state electrolyte (e.g., a sulfide-based solid state electrolyte), an anode, and an interfacial layer between the solid-state electrolyte and the anode, wherein the interfacial layer includes a lithium metal sulfide that exhibits a lithium stability score greater than that of $Al_2O_3$, a $H_2O$ stability score of greater than that of $Al_2O_3$, a band gap of greater than 1 eV, a probability of greater than 0.96 for ionic conductivity of greater than $10^{-4}$ S/cm or a combination thereof. In any such embodiments, the anode may include a lithium metal foil.

In some aspects, an electrochemical cell includes a sulfide-based solid-state electrolyte, an anode, and an interfacial layer between the solid-state electrolyte and the anode, wherein the interfacial layer comprises a lithium metal sulfide that exhibits a lithium stability score and a $H_2O$ stability score of greater than that of $Al_2O_3$, a band gap of greater than 1 eV, and a ionic conductivity of greater than $10^{-8}$ S/cm.

In another aspect, an electrochemical cell includes a sulfide-based solid-state electrolyte, an anode, and an interfacial layer between the solid-state electrolyte and the anode, wherein the interfacial layer includes a lithium metal sulfide that has thermodynamic phase stability, exhibits an interface protection capability better than baseline coating material (e.g., $Al_2O_3$) and has good moisture stability. In any such embodiments, the anode may include a lithium metal foil.

In a further aspect, a lithium metal anode coating material includes a lithium-metal-sulfide having a moisture stability better than that of $Al_2O_3$ (baseline coating material), a band gap of greater than 1 eV, high probability of ionic conductivity of greater than 10'S/cm, and good chemical and electrochemical stability (oxidation potential above 2.1V) with sulfide electrolyte. In any such embodiments, the anode may include a lithium metal foil.

In another aspect, a solid-state battery includes a lithium metal sulfide separating an anode and a solid-state electrolyte, wherein the lithium metal sulfide that exhibits a lithium stability score and a $H_2O$ stability score of greater than that of $Al_2O_3$, a band gap of greater than 1 eV, and a probability of greater than 0.96 for ionic conductivity of greater than $10^{-4}$ S/cm. In any such embodiments, the anode may include a lithium metal foil.

In a further aspect, a solid-state battery includes a lithium metal sulfide separating an anode and a solid-state electrolyte, wherein the lithium metal sulfide that exhibits a lithium stability score and a $H_2O$ stability score of greater than that of $Al_2O_3$, a band gap of greater than 1 eV, and a ionic conductivity of greater than $10^{-8}$ S/cm.

In a yet another aspect, a lithium metal anode coating material includes a lithium-metal-sulfide having a band gap of greater than 1 eV, a redox window of greater than 1.5 V, and an ionic conductivity of greater than $1.5\times10^{-4}$ S/cm. In any such embodiments, the anode may include a lithium metal foil.

In a yet further aspect, a method of coating a lithium metal sulfide materials onto an anode is provided. Such methods may include depositing on the anode material, following anode formation, a layer of lithium metal sulfide using the appropriate stoichiometric ratios of the metal constituents of the layer via chemical vapor deposition (CVD), physical vapor deposition (PVD), pulsed laser deposition (PLD), emulsion, sol-gel, atomic layer deposition (ALD), and/or other deposition techniques.

In other aspects, a solid-state battery cell may be incorporated into a battery pack comprising a plurality of the solid-state battery cells. Such batteries, battery cells, or battery packs may then be incorporated in a hybrid electric vehicle or electric vehicle as a power source.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

It has now been found that an interfacial layer, either as a separate layer or as a coating on the anode may be formed in a solid-state battery to improve the stability of the battery and prevent reactions between electrolyte and anode. The interfacial layers are ionically conductive while being electronically insulating, and they protect the underlying anode active material from degrading reactions with the solid-state electrolyte materials.

Through incorporation of lithium metal ($Li^0$) anodes in solid-state batteries (SSBs), the energy density of rechargeable batteries may be increased. However, lithium metal is reactive with many electrolytes, thereby degrading both the anode material and the electrolytes. Lithium metal sulfide materials have now been found to be good lithium metal anode coatings that are not reactive with the solid-state electrolytes (i.e. $Li_3PS_4$- or $Li_6PS_5Cl$-type materials). The lithium metal sulfide materials may be deposited on the metal anode surface prior to cell assembly as a coating. The coating may have a thickness that is from about 1 nanometer (nm) to several micrometers (μm). The coatings are durable and electronically insulating.

Figure 1A:
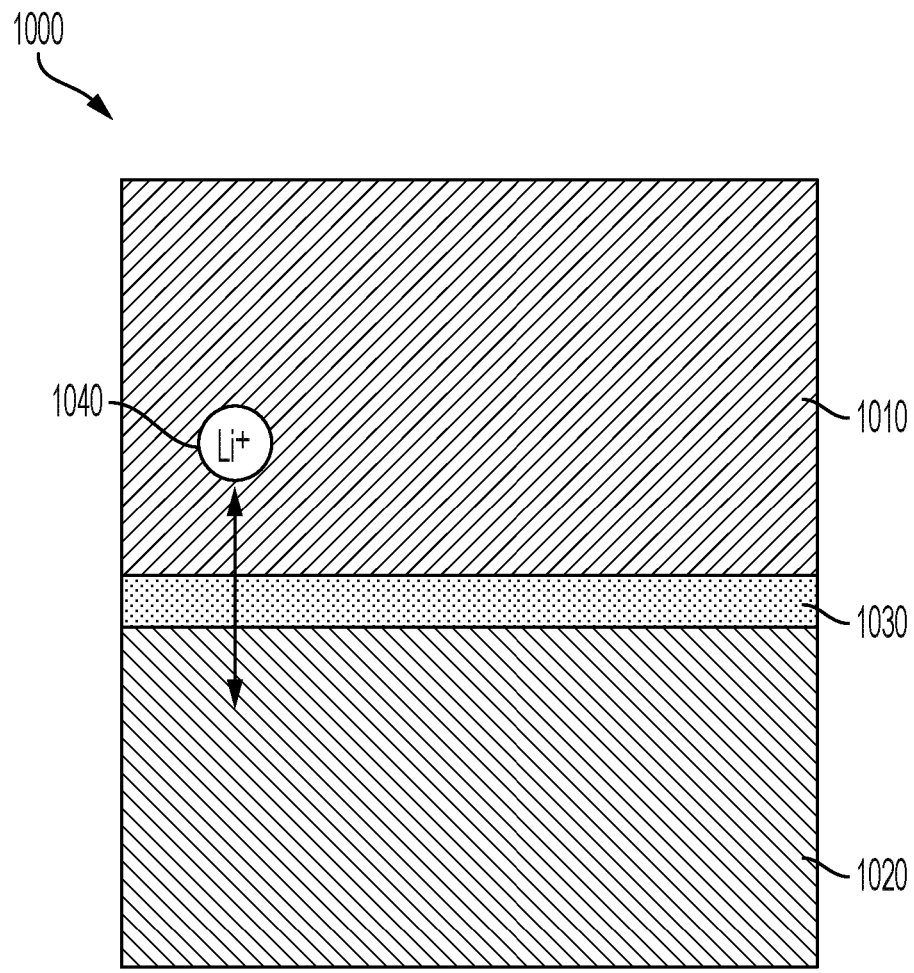
FIG. 1A is a schematic illustration of a lithium metal sulfide interfacial layer between an anode and a solid-state electrolyte.

In a first aspect, an electrochemical cell 1000 is provided that includes a solid-state electrolyte 1010, an anode 1020, and an interfacial layer 1030 between the solid-state electrolyte and the anode, where lithium ions 1040 may be transported between the anode 1020 and the electrolyte 1010. See FIG. 1A. The interfacial layer may include a lithium metal sulfide that may be at least partially covering the contact surface between the solid-state electrolyte and the anode. The interfacial layer may be formed as a stand-alone layer that is then inserted between the anode and the solid-state electrolyte, or it may be formed as a coating on the anode and/or the solid-state electrolyte prior to electrochemical construction. In some embodiments, the anode is a lithium metal anode. In other embodiments, the anode does not include lithium metal. In yet other embodiments, the anode may comprise silicon, carbon, or a composite thereof.

Figure 1B:
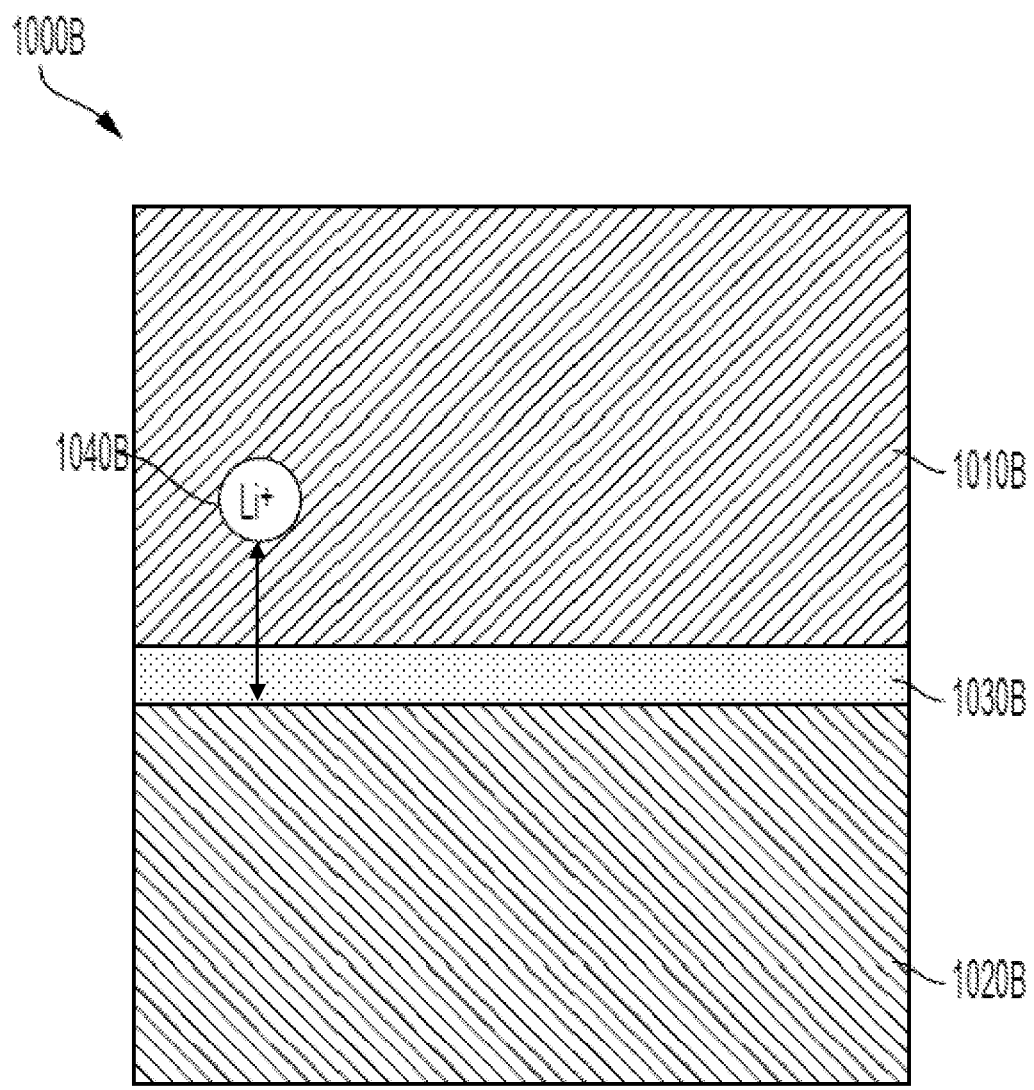
FIG. 1B is a schematic illustration of a lithium metal sulfide interfacial layer between an anode-free design and a solid-state electrolyte.

FIG. 1B illustrates an anode-free design, where a solid-state electrolyte 1010B and an anode current collector 1020B may include a lithium metal sulfide 1030B as an interfacial layer between the solid-state electrode 1010B and the anode current collector 1020B, and where lithium ions 1040B are transportable through the solid-state electrolyte 1010B to the surface of the anode current collector. See FIG. 1A. Upon discharge of the cell, lithium ions are plated to the current collector through the solid-state electrolyte and/or lithium polyanionic oxide.

The lithium metal sulfides may be generally characterized as exhibiting a lithium stability score and moisture stability score of greater than that of $Al_2O_3$, a high band gap, and a high probability of ionic conductivity of greater than $10^{-4}$ S/cm. The band gap and ionic conductivity may be calculated or experimentally determined and are typically presented in units of electron-volts (eV) and Siemen's per cm ("S/cm"), respectively. The lithium stability score is determined as illustrated in the examples. Briefly, it is a measure of whether or not the coating is in chemical equilibrium with the lithium metal (to the extent chemical equilibrium is considered, it is not one that results in degradation of the anode, cathode, solid-state electrolyte, or interfacial coating). The calculations are based upon normalization to the state of the art anode coating of $Al_2O_3$ for the sake of relative comparisons. The calculated enthalpy of reaction ($E_{rxn}$) is determined between the $Al_2O_3$ (or the lithium metal sulfide) and lithium, as well as the molar ratio between them. The molar ratio is then normalized to that of the $Al_2O_3$ reaction ("ratio v. $Al_2O_3$"). The enthalpy of reaction is also normalized to that of the $Al_2O_3$ reaction ("$E_{rxn}$ v. $Al_2O_3$"). The two ratios v. $Al_2O_3$ are then summed and converted by dividing by molecular weight and multiplying by 1000. The percentage change is then reported, where $Al_2O_3$ is 100, where higher values indicate an improvement over the baseline $Al_2O_3$. Similar approach is used to measure moisture stability score against $Al_2O_3$.

In any of the above embodiments, the band gap may be above 1 eV and the ionic conductivity is greater than that of binary metal oxide coatings.

As another measure for the lithium metal sulfides, the chemical and electrochemical stability against sulfide electrolyte is also defined.

According to various embodiments, the lithium metal sulfide may be a material of general formula $Li_xMS_x$ or $Li_xMS_{2x}$ where M is Y, Sn, Sc, In, Au, Zn, Ge, Ga or a mixture of any two or more thereof; x is 1 to 4. In any such embodiments, M may be Y, Sn, Sc, In, Ge, or a mixture of any two or more thereof. Illustrative lithium metal sulfides include, but are not limited to, $LiScS_2$, $LiYS_2$, $Li_4SnS_4$, $LiInS_2$, $Li_4GeS_4$, $LiGaS_2$, $Li_3AuS_2$, $LiAuS$, $Li_2ZnSnS_4$, or a mixture of any two or more thereof. In some embodiments, the lithium metal sulfide may be $LiScS_2$, $LiYS_2$, $Li_4SnS_4$, $LiInS_2$, $Li_4GeS_4$, or a mixture of any two or more thereof. In other embodiments, the lithium metal sulfide may be $LiScS_2$, $LiYS_2$, or a mixture thereof.

As noted above, in some embodiments, the interfacial layers that include the lithium metal sulfides are intended for use with the anodes and solid-state electrolytes. Illustrative solid-state electrolytes that may be used include, but are not limited to, $Li_3PS_4$, $Li_7P_3S_{11}$, $Li_2S$—$P_2S_5$, or $Li_6PS_5Cl$.

The electrochemical cells described herein may also include a cathode comprising a cathode active material such as, but not limited to any of a variety of lithium nickel manganese cobalt oxides (LiNMC), lithium iron phosphate (LFP), or lithium cobalt oxide (LCO) materials.

The cathodes may include a cathode active material and one or more of a current collector, a conductive carbon, a binder, and other additives. The electrodes may also contain other materials such as conductive carbon materials, current collectors, binders, and other additives. Illustrative conductive carbon species include graphite, carbon black, Super P carbon black material, Ketjen Black, Acetylene Black, SWCNT, MWCNT, graphite, carbon nanofiber, and/or graphene, graphite. Illustrative binders may include, but are not limited to, polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Other illustrative binder materials can include one or more of: agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrilic acid (PAA), poly(methyl acrylate) (PMA), poly(vinyl alcohol) (PVA), poly (vinyl acetate) (PVAc), polyacrylonitrile (PAN), polyisoprene (Plpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof. The current collector may include a metal that is aluminum, copper, nickel, titanium, stainless steel, or carbonaceous materials. In some embodiments, the metal of the current collector is in the form of a metal foil. In some specific embodiments, the current collector is an aluminum (Al) or copper (Cu) foil. In some embodiments, the current collector is a metal alloy, made of Al, Cu, Ni, Fe, Ti, or combination thereof. In another embodiment, the metal foils maybe coated with carbon: e.g., carbon-coated Al foil and the like.

The anodes of the electrochemical cells may include lithium. For examples, the anode may include lithium metal, lithium metal foil, and the like.

In some embodiments, the anodes may also include a current collector, a conductive carbon, a binder, and other additives. The metal of the current collector may include conductive metals such as Al, Cu, Au, Fe, Ag, Pt, Pd, or mixtures or alloys of any two or more such metals. In some embodiments, the metal is a metal foil. In other embodiments, the metal is an aluminum (Al) foil. Illustrative conductive carbon species include, but are not limited to, graphite, carbon black, carbon nanotubes, and the like. Illustrative binders include, but are not limited to, polyvinylidenefluoride (PVDF).

The anodes of the electrochemical cells may include lithium. In some embodiments, the anodes may also include a current collector, a conductive carbon, a binder, and other additives, as described above with regard to the cathode current collectors, conductive carbon, binders, and other additives. In some embodiments, the electrode may comprise a current collector (e.g., Cu foil) with an in situ-formed anode (e.g., Li metal) on a surface of the current collector facing the separator or solid-state electrolyte such that in an uncharged state, the assembled cell does not comprise an anode active material.

The electrochemical cells described herein include lithium secondary batteries.

In another aspect, a solid-state battery cell is provided that includes a lithium metal sulfide separating an anode and a sulfide-based solid-state electrolyte, wherein the lithium metal sulfide exhibits chemical stability against the anode and electrolyte, has moisture stability and a band gap of greater than 1 eV. The lithium metal sulfide may be present as an interfacial layer and/or as a coating on the surface of the anode or the solid-state electrolyte or both the anode and electrolyte. The lithium metal sulfide may be at least partially covering the contact surface between the solid-state electrolyte and the anode. Such battery cells may be prismatic, cylindrical, or pouch type cells. In some embodiments, the anode is a lithium metal anode.

The solid-state battery described herein may also include a cathode comprising a cathode active material. Illustrative cathode active materials include, but not limited to any of a variety of lithium nickel manganese cobalt oxide (NMC), lithium iron phosphate (LFP), or lithium cobalt oxide (LCO).

The cathodes used in the solid-state battery may include a cathode active material and one or more of a current collector, a conductive carbon, a binder, and other additives. The electrodes may also contain other materials such as conductive carbon materials, current collectors, binders, and other additives. Illustrative conductive carbon species include graphite, carbon black, Super P carbon black material, Ketjen Black, Acetylene Black, SWCNT, MWCNT, graphite, carbon nanofiber, and/or graphene, graphite. Illustrative binders may include, but are not limited to, polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Other illustrative binder materials can include one or more of: agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrilic acid (PAA), poly(methyl acrylate) (PMA), poly(vinyl alcohol) (PVA), poly(vinyl acetate) (PVAc), polyacrylonitrile (PAN), polyisoprene (Plpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof. The current collector may include a metal that is aluminum, copper, nickel, titanium, stainless steel, or carbonaceous materials. In some embodiments, the metal of the current collector is in the form of a metal foil. In some specific embodiments, the current collector is an aluminum (Al) or copper (Cu) foil. In some embodiments, the current collector is a metal alloy, made of Al, Cu, Ni, Fe, Ti, or combination thereof. In another embodiment, the metal foils maybe coated with carbon: e.g., carbon-coated Al foil, and the like.

According to various embodiments, the lithium metal sulfide may be a material of formula $Li_xMS_x$ or $Li_xMS_{2x}$ where M is Y, Sn, Sc, In, Au, Zn, Ge, Ga or a mixture of any two or more thereof; x is 1 to 4. In any such embodiments, M may be Y, Sn, Sc, In, Ge, or a mixture of any two or more thereof. Illustrative lithium metal sulfides include, but are not limited to, $LiScS_2$, $LiYS_2$, $Li_4SnS_4$, $LiInS_2$, $Li_4GeS_4$, $LiGaS_2$, $Li_3AuS_2$, $LiAuS$, $Li_2ZnSnS_4$, or a mixture of any two or more thereof. In some embodiments, the lithium metal sulfide may be $LiScS_2$, $LiYS_2$, $Li_4SnS_4$, $LiInS_2$, $Li_4GeS_4$, or a mixture of any two or more thereof. In other embodiments, the lithium metal sulfide may be $LiScS_2$, $LiYS_2$, or a mixture thereof.

In a yet further aspect, methods of coating the lithium metal sulfide materials onto the anode are provided. Such methods may include depositing on the anode material, following anode formation, a layer of lithium metal sulfide using the appropriate stoichiometric ratios of the metal constituents of the layer via chemical vapor deposition (CVD), physical vapor deposition (PVD), pulsed laser deposition (PLD), emulsion, sol-gel, atomic layer deposition (ALD), and/or other deposition techniques. For example, a lithium metal sulfide may be deposited via ALD using precursor materials containing lithium and sulfur elements, as well as a precursor source for the metal. Illustrative lithium element sources include materials such as, but not limited to, lithium halides, lithium alkoxides (i.e. lithium tert-butoxide), lithium oxides, lithium acetate, lithium carbonate, and lithium hydroxides. Illustrative sulfur element sources include, but are not limited to $H_2S$, $Li_2S$, mercaptans, and other thiol containing materials. Illustrative "metal" sources for the lithium metal sulfides include the metals, metal oxides, metal halides, metal nitrides, metal carbonates, metal acetate, and the like. By controlling the ratio of $Li_2S$ to $M_yS_z$ ALD cycles, we can deposit the lithium metal sulfide layers or "films" of a wide variety of stoichiometric compositions.

Additional methods of coating the lithium metal sulfide materials onto the anode are also provided. Such methods may include depositing the lithium metal sulfide via any of the above methods onto a release surface such that the deposited layer or "film" may be lifted and applied to the surface of the anode as a standalone film separating the anode from the cathode.

In another aspect, the present disclosure provides a battery pack comprising the cathode active material, the electrochemical cell, or the lithium ion battery of any one of the above embodiments. The battery pack may find a wide variety of applications including but are not limited to general energy storage or in vehicles.

Figure 5:
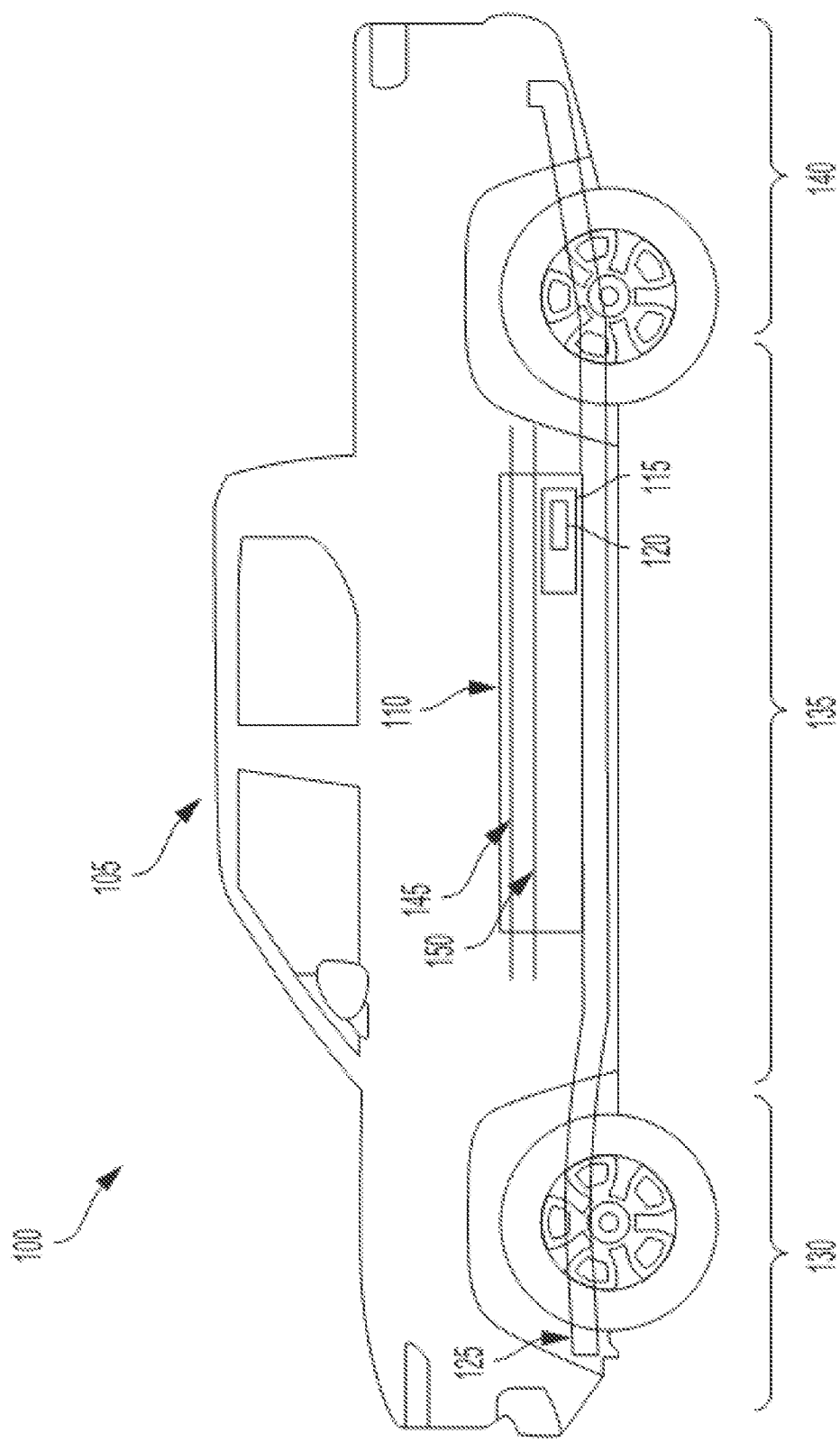
FIG. 5 is an illustration of a cross-sectional view of an electric vehicle, according to various embodiments.

In another aspect, a plurality of battery cells as described above may be used to form a battery and/or a battery pack, that may find a wide variety of applications such as general storage, or in vehicles. By way of illustration of the use of such batteries or battery packs in an electric vehicle, FIG. 5 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 6:
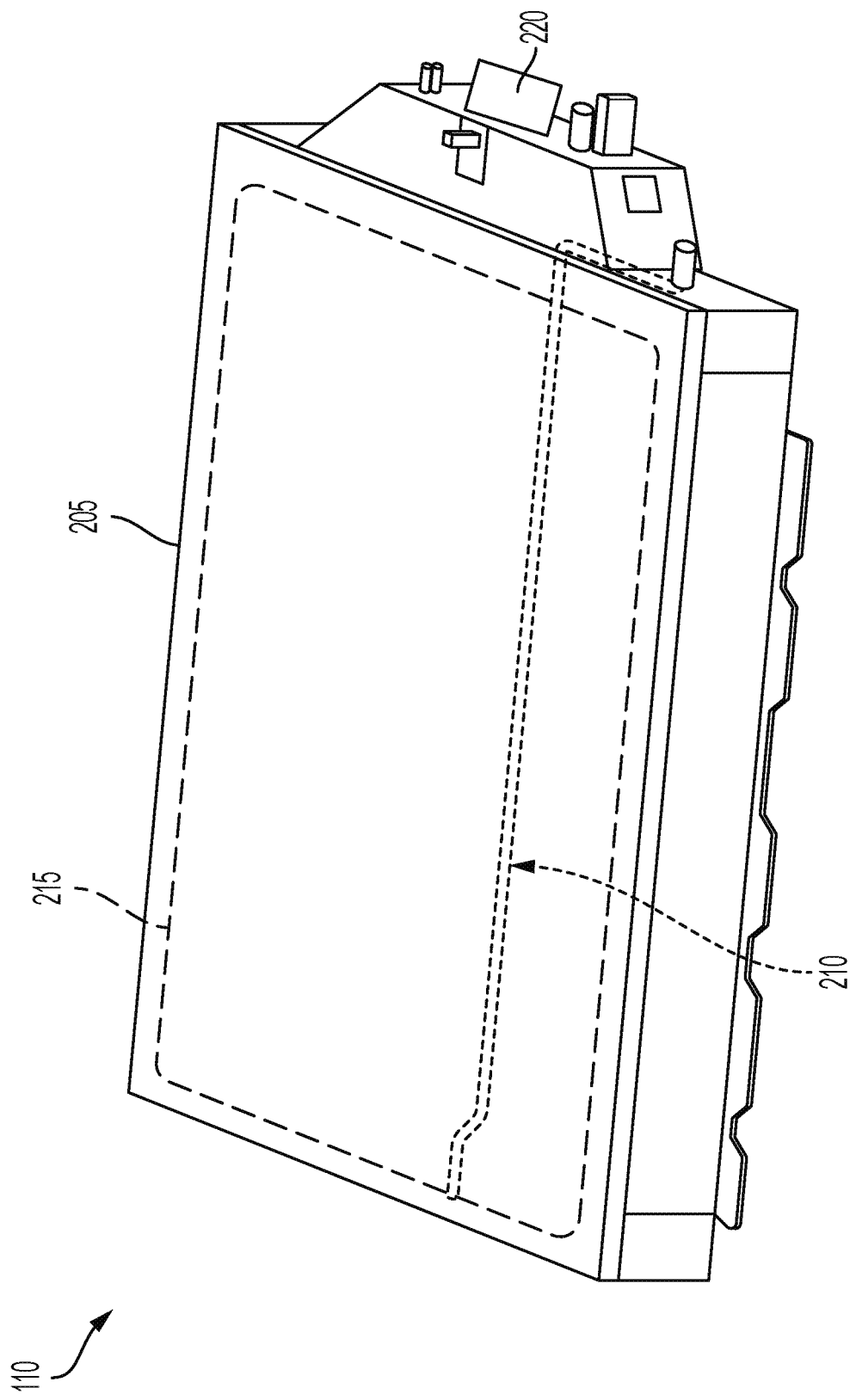
FIG. 6 is a depiction of an illustrative battery pack, according to various embodiments.

FIG. 6 depicts an example battery pack 110. Referring to FIG. 6, among others, the battery pack 110 can provide power to electric vehicle 105. Battery packs 110 can include any arrangement or network of electrical, electronic, mechanical, or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom or underneath the battery module 115 to protect the battery module 115 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one cold plate 215. The cold plate 215 can be positioned in relation to a top submodule and a bottom submodule, such as in between the top and bottom submodules, among other possibilities. The battery pack 110 can include any number of cold plates 215. For example, there can be one or more cold plates 215 per battery pack 110, or per battery module 115. At least one cooling line 210 can be coupled with, part of, or independent from the cold plate 215.

Figure 7:
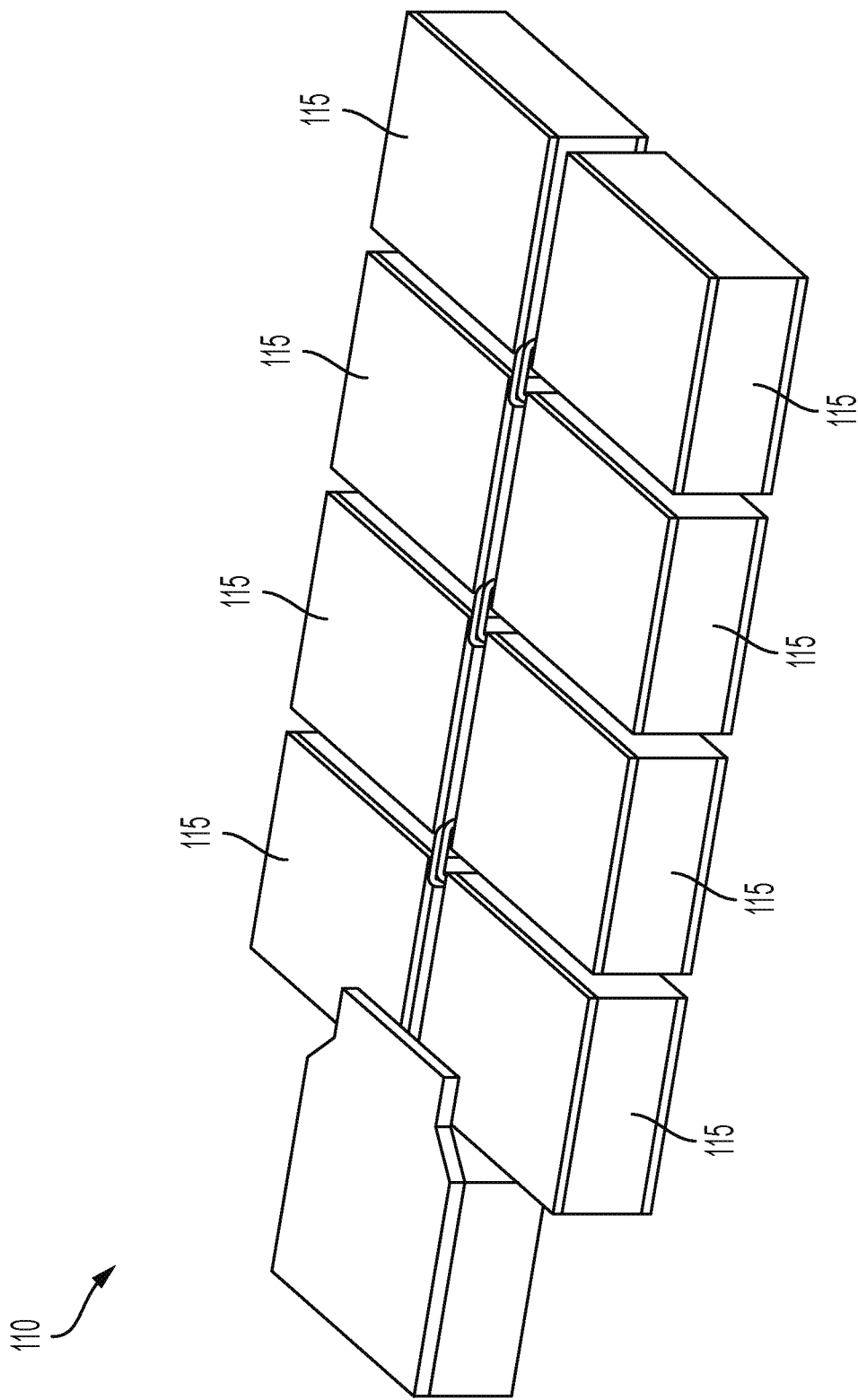
FIG. 7 is a depiction of an illustrative battery module, according to various embodiments.
Figure 8:
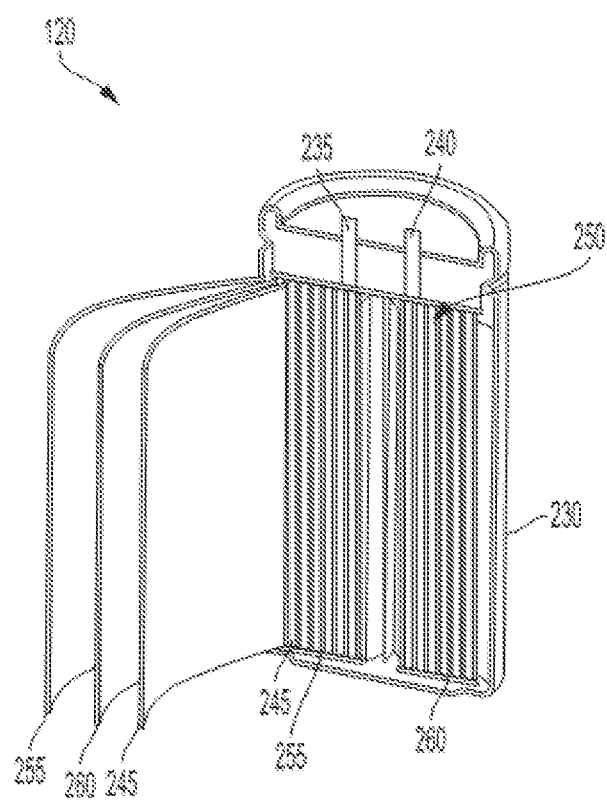
FIG. 8 is a depiction of an illustrative battery with an illustrative cross sectional view, according to various embodiments.

FIG. 7 depicts example battery modules 115, and FIG. 8 depicts an illustrative cross sectional view of a battery cell 120. The battery modules 115 can include at least one submodule. For example, the battery modules 115 can include at least one first (e.g., top) submodule 220 or at least one second (e.g., bottom) submodule 225. At least one cold plate 215 can be disposed between the top submodule 220 and the bottom submodule 225. For example, one cold plate 215 can be configured for heat exchange with one battery module 115. The cold plate 215 can be disposed or thermally coupled between the top submodule 220 and the bottom submodule 225. One cold plate 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a cold plate 215 in between the top submodule 220 and the bottom submodule 225. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, or prismatic form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can generate or provide electric power for the battery cell 120. A first portion of the electrolyte material can have a first polarity, and a second portion of the electrolyte material can have a second polarity. The housing 230 can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted), elliptical, or ovular base, among others. The shape of the housing 230 can also be prismatic with a polygonal base, such as a triangle, a square, a rectangle, a pentagon, and a hexagon, among others.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

The battery cell 120 can include at least one anode layer 245, which can be disposed within the cavity 250 defined by the housing 230. The anode layer 245 can receive electrical current into the battery cell 120 and output electrons during the operation of the battery cell 120 (e.g., charging or discharging of the battery cell 120). The anode layer 245 can include an active substance.

The battery cell 120 can include at least one cathode layer 255 (e.g., a composite cathode layer compound cathode layer, a compound cathode, a composite cathode, or a cathode). The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can transfer ions between the anode layer 245 and the cathode layer 255. The electrolyte layer 260 can transfer cations from the anode layer 245 to the cathode layer 255 during the operation of the battery cell 120. The electrolyte layer 260 can transfer cations (e.g., lithium ions) from the cathode layer 255 to the anode layer 245 during the operation of the battery cell 120.

The present invention, thus generally described, will be understood more readily by reference to the following examples, which are provided by way of illustration and are not intended to be limiting of the present invention.

EXAMPLES

General. First-principles density functional theory (DFT) methodologies were used to model the stability of the $Li_3PS_4$ electrolyte-Li metal interface in the presence of various lithium metal sulfides (Li-M-S) as coatings. In particular, the interface app in materialproject.org, an open access materials database that is open to public was used to conduct the analysis.

Methodology. The screening strategy employed the following criteria to identify potential anode coatings materials for $Li_3PS_4$-based solid-state batteries: (a) lithium content (b) stability/synthesizability, (c) electronic insulation, and (d) equilibrium with the sulfide electrolyte ($Li_3PS_4$). Additionally, we discarded all compounds with radioactive, toxic, costly, and rare elements to ensure mass synthesizability. Halides were also excluded due the corrosive effects of residual halide components.

Starting with more than 18,000 Li containing binary, ternary, and quaternary compounds, thermodynamically stable and/or metastable sulfide compounds that are likely to be experimentally synthesized were evaluated. Thermodynamic stability is quantified based on the energy of the compound above the convex hull ($E_{hull}$) in the chemical space of elements that make up the material and such data are readily acquired from the materials project database. A compound with $E_{hull}=0$ lies in the energy convex hull and is a thermodynamically stable phase at 0 K. A compound with $E_{hull}>0$ is thermodynamically metastable and a material with a high energy above hull (e.g. >100 meV/atom) may have a strong driving force to decomposition and would be difficult to synthesize experimentally. Excluding noble metal groups (e.g., Pt, Au, etc.), halides (Cl, F, Br, and I), radioactive (Th, Ra, Tc, U, etc.) and toxic chemical elements (e.g., Pb, As, Cd, etc.) and a list of 834 Li containing sulfide compounds that are likely to be experimentally synthesized on large scale were identified.

For electronically insulating coatings, compounds were identified that exhibit a bandgap of greater than 1.0 eV, which reduced the list to 155 compounds, which was then further reduced by elimination of candidates based on whether they exhibit chemical equilibrium with $Li_3PS_4$ electrolyte or not. To compute whether a compound exhibits equilibrium with the electrolyte, materials project uses the convex hull method. For each candidate compound, the convex hull is calculated for the set of elements defined by the compound plus the electrolyte material. Within this convex hull, tie line connecting the candidate compound with the electrolyte material is looked for. The presence of such a tie line is the indication that the candidate compound does exhibit stable equilibrium with the electrolyte. The absence of such a tie line indicates that the candidate compound does not exhibit stable equilibrium with the electrolyte but rather reacts.

Figure 2:
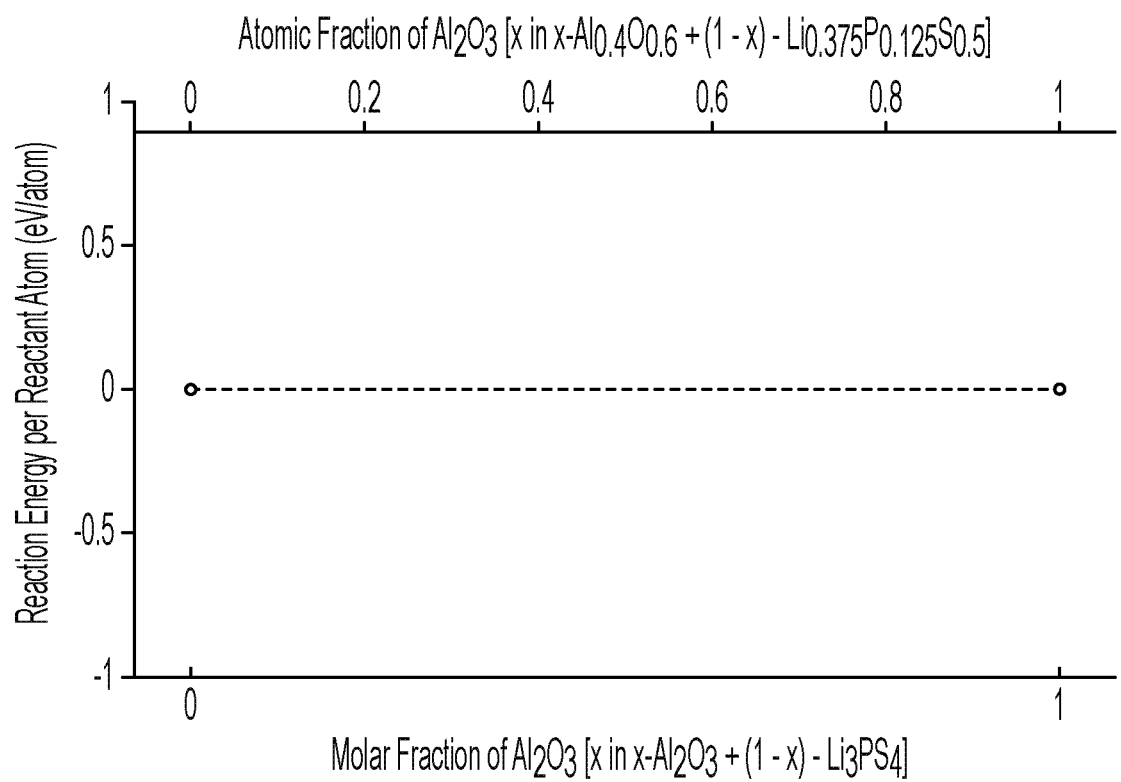
FIG. 2 is calculated reaction energy profile for a chemical reaction between $Li_3PS_4$ and $Al_2O_3$, where the x-axis shows the molar fraction of $Al_2O_3$ (x=0 is 100% $Li_3PS_4$ and x=1 is 100% $Al_2O_3$) and the y-axis describes the reaction enthalpy in eV/atom, as illustrated in the examples.
Figure 3:
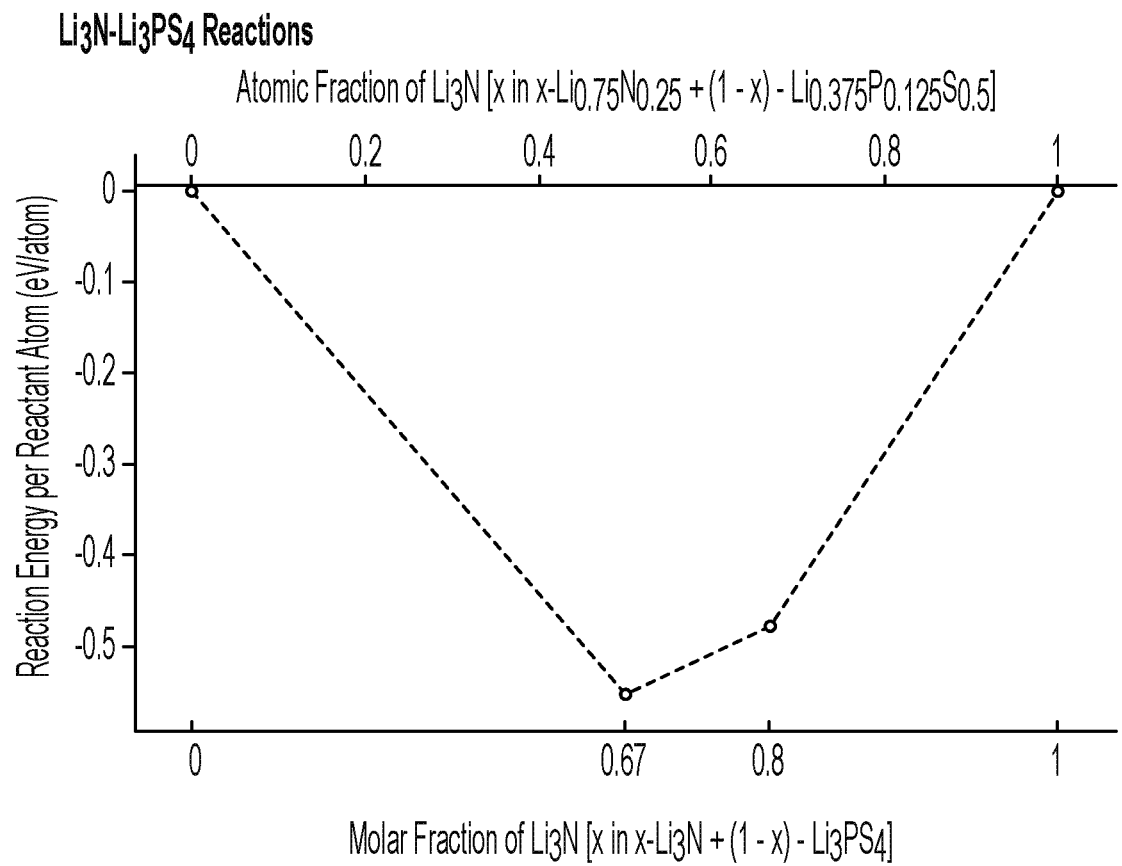
FIG. 3 is calculated reaction energy profile for a chemical reaction between $Li_3PS_4$ and $Li_3N$, where the x-axis shows the molar fraction of $Li_3N$ (x=0 is 100% $Li_3PS_4$ and x=1 is 100% $Li_3N$) and the y-axis describes the reaction enthalpy in eV/atom, as illustrated in the examples.
Figure 4:
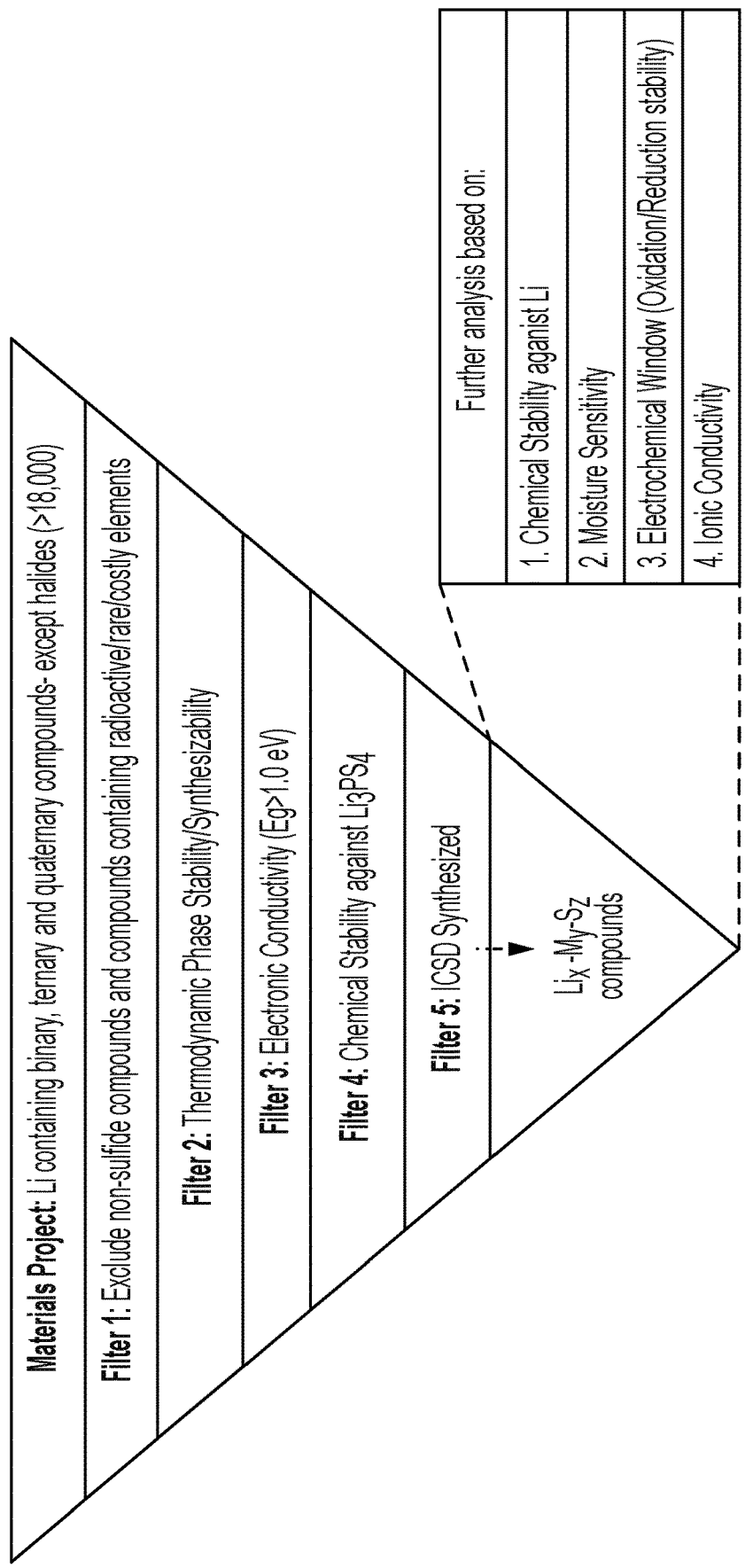
FIG. 4 is a schematic illustration of the identification of lithium metal sulfide interfacial layer candidates, according to the examples.

FIG. 2 illustrates the chemical reaction profile for $Li_3PS_4$ and $Al_2O_3$. Illustrated is a straight line between the molar fraction x=0 to x=1, with zero reaction energy per atom (i.e., y=0 eV/atom). FIG. 2 demonstrates that if $Al_2O_3$ is deposited on Li anode as an interfacial coating between the anode and the electrolyte they do not react with the $Li_3PS_4$ electrolyte. As a comparison, FIG. 3, illustrates the reaction profile of $Li_3N$ as a coating on Li, where it does react with the $Li_3PS_4$ electrolyte. The most energetically favorable chemical reaction has a $E_{rxn}$ of −0.553 eV/atom. Using this predictive analysis, a number of lithium metal sulfide compounds were identified as being stable with regard to reaction with $Li_3PS_4$, see Table 1. Because all resulted in no expected reaction the $E_{rxn}$ is not reported (N/A). Thirty two Li containing sulfide compounds were found to be stable with $Li_3PS_4$ (a widely reported sulfide-based solid electrolyte class), which were further screened using a filter to sort those that are only reported as theoretical (T) compounds versus those that have been reported as synthesized experimentally (E), and are, therefore, potential coating materials for $Li_3PS_4$ electrolyte-Li metal interfaces. The workflow is described in FIG. 4.

identifying potential coating candidates, it is also preferred that the coating is in chemical equilibrium with Li metal. For example, in Table-2, 0.151 $Al_2O_3$ (a conventional coating) reacts with 0.849 Li to form 0.113 $Li_5AlO_2$ and 0.094 $Li_3Al_2$ with $E_{rxn}$ of −0.220 eV/atom. The ratio between Li to $Al_2O_3$ is 0.849/0.151=5.623 for this reaction. Table 2 is a presentation of the results of the evaluation of a number of Li-containing sulfide compounds vs. $Al_2O_3$ (e.g. an accepted state-of-art coating material for Li metal anode is SSBs). For example, $LiYS_2$ has a Li:$LiYS_2$=1, and therefore 1/5.623=0.1778 in the 'Ratio vs $Al_2O_3$' column. For the Li reaction, it is beneficial if the "Ratio" value of the coating is less than that of the Li—$Al_2O_3$ reaction ratio (i.e., the sulfide coating consumes less Li). Similarly, it is desired that the $E_{rxn}$ of Li vs coating material to be higher (i.e., less favorable to react with Li) when compared to Li vs $Al_2O_3$ reaction. Comparison of the $E_{rxn}$ of the screened sulfide materials vs. $Al_2O_3$ is presented in the '$E_{rxn}$ vs $Al_2O_3$' column. The two values that are referenced to $Al_2O_3$ for molar ratio and reaction enthalpy are then summed. Since these values are evaluated based on the molar fraction, they are then converted by dividing by molecular weight: e.g., 2.00/101.961× 1,000=19.615 for $Al_2O_3$. The last column ('Li Stability Score') is a percentage improvement vs. $Al_2O_3$ for all materials: 16.615/4.521×100=433.84% for $LiYS_2$. In Table 5, it is noted that all 19 screened sulfides show improved or comparable performance for Li stability, when to compared with the state-of-art $Al_2O_3$ material. Reaction with Li was also evaluated, to see if they would lead to the formation of

TABLE 1

Chemical stability of lithium metal sulfides with $Li_3PS_4$.

| Compound | Band Gap (eV) | Reaction with Sulfide Electrolyte | $E_{rxn}$ (ev/atom) | T vs. E |
|---|---|---|---|---|
| $LiAlS_2$ | 4.1061 | $Li_3PS_4 + LiAlS_2$ -> No Reaction | N/A | E |
| $Li_2S$ | 3.4946 | $Li_3PS_4 + Li_2S$ -> No Reaction | N/A | E |
| $Li_2SiS_3$ | 3.1777 | $Li_3PS_4 + Li_2SiS_3$ -> No Reaction | N/A | T |
| $LiGaS_2$ | 2.9262 | $Li_3PS_4 + LiGaS_2$ -> No Reaction | N/A | E |
| $Li_3PS_4$ | 2.8091 | $Li_3PS_4 + Li_3PS_4$ -> No Reaction | N/A | T |
| $LiAl(PS_3)_2$ | 2.749 | $Li_3PS_4 + LiAl(PS_3)_2$ -> No Reaction | N/A | E |
| $LiZnPS_4$ | 2.7312 | $Li_3PS_4 + LiZnPS_4$ -> No Reaction | N/A | E |
| $Li_4GeS_4$ | 2.6144 | $Li_3PS_4 + Li_4GeS_4$ -> No Reaction | N/A | E |
| $Li_3SbS_3$ | 2.4016 | $Li_3PS_4 + Li_3SbS_3$ -> No Reaction | N/A | E |
| $Li_4TiS_4$ | 2.3658 | $Li_3PS_4 + Li_4TiS_4$ -> No Reaction | N/A | T |
| $Li_4SnS_4$ | 2.3564 | $Li_3PS_4 + Li_4SnS_4$ -> No Reaction | N/A | E |
| $Li_2ZnSnS_4$ | 2.3137 | $Li_3PS_4 + Li_2ZnSnS_4$ -> No Reaction | N/A | E |
| $LiInS_2$ | 2.2212 | $Li_3PS_4 + LiInS_2$ -> No Reaction | N/A | E |
| $Li_2ZnGeS_4$ | 2.1846 | $Li_3PS_4 + Li_2ZnGeS_4$ -> No Reaction | N/A | T |
| $LiS_4$ | 2.1585 | $Li_3PS_4 + LiS_4$ -> No Reaction | N/A | T |
| $Li_3SbS_4$ | 2.1452 | $Li_3PS_4 + Li_3SbS_4$ -> No Reaction | N/A | T |
| $Li_3AuS_2$ | 2.0985 | $Li_3PS_4 + Li_3AuS_2$ -> No Reaction | N/A | E |
| $Li_3CuS_2$ | 2.0335 | $Li_3PS_4 + Li_3CuS_2$ -> No Reaction | N/A | T |
| $Na_5Li_3(TiS_4)_2$ | 1.9652 | $Li_3PS_4 + Na_5Li_3(TiS_4)_2$ -> No Reaction | N/A | E |
| $LiYS_2$ | 1.9597 | $Li_3PS_4 + LiYS_2$ -> No Reaction | N/A | E |
| $LiAuS$ | 1.6573 | $Li_3PS_4 + LiAuS$ -> No Reaction | N/A | E |
| $Li_3VS_4$ | 1.6175 | $Li_3PS_4 + Li_3VS_4$ -> No Reaction | N/A | T |
| $LiScS_2$ | 1.5272 | $Li_3PS_4 + LiScS_2$ -> No Reaction | N/A | E |
| $Li_4MnGe_2S_7$ | 1.5209 | $Li_3PS_4 + Li_4MnGe_2S_7$ -> No Reaction | N/A | E |
| $K_2LiVS_4$ | 1.5185 | $Li_3PS_4 + K_2LiVS_4$ -> No Reaction | N/A | T |
| $LiBiS_2$ | 1.4793 | $Li_3PS_4 + LiBiS_2$ -> No Reaction | N/A | T |
| $Li_3Cr_2(PS_4)_3$ | 1.2201 | $Li_3PS_4 + Li_3Cr_2(PS_4)_3$ -> No Reaction | N/A | T |
| $Li_3NbS_4$ | 1.2022 | $Li_3PS_4 + Li_3NbS_4$ -> No Reaction | N/A | T |
| $LiSbS_2$ | 1.1725 | $Li_3PS_4 + LiSbS_2$ -> No Reaction | N/A | E |
| $Li_2MnSnS_4$ | 1.1047 | $Li_3PS_4 + Li_2MnSnS_4$ -> No Reaction | N/A | E |
| $Li_7Y_7Zr_9S_{32}$ | 1.0523 | $Li_3PS_4 + Li_7Y_7Zr_9S_{32}$ -> No Reaction | N/A | T |
| $Li_8TiS_6$ | 1.0393 | $Li_3PS_4 + Li_8TiS_6$ -> No Reaction | N/A | T |

Stability to reaction with Li metal. It is desirable that the Li-containing sulfide coating be in chemical equilibrium with Li, exchanging Li atoms in a facile manner. For a significant amount $Li_2S$ that, according to Table 1 and 2, is not sensitive to or does not react with both Li metal and $Li_3PS_4$, as well as have high band-gap energy.

TABLE 2

Chemical stability with Li metal.

| Compound | Reaction with Sulfide Electrolyte | Ratio | Ratio vs $Al_2O_3$ | $E_{rxn}$ (ev/atom) | $E_{rxn}$ vs $Al_2O_3$ | Li Stability Score |
|---|---|---|---|---|---|---|
| $Al_2O_3$ | 0.849 Li + 0.151 $Al_2O_3$ => 0.094 $Li_3Al_2$ + 0.113 $Li_5AlO_4$ | 5.623 | 1 | −0.220 | 1 | 100.00 |
| $Li_2S$ | Li + $Li_2S$ => No reaction | N/A | N/A | N/A | N/A | N/A |
| $LiYS_2$ | 0.5 Li + 0.5 $LiYS_2$ => 0.5 $Li_2S$ + 0.5 YS | 1 | 0.1778 | −0.12 | 0.5455 | 433.8426 |
| $Li_3AuS_2$ | 0.667 Li + 0.333 $Li_3AuS_2$ => 0.333 LiAu + 0.667 $Li_2S$ | 2.003 | 0.3562 | −0.358 | 1.6273 | 278.7950 |
| $Na_5Li_3(TiS_4)_2$ | 0.929 Li + 0.071 $Na_5Li_3(TiS_4)_2$ => 0.571 $Li_2S$ + 0.357 Na + 0.143 Ti | 13.085 | 2.3270 | −0.284 | 1.2909 | 264.5878 |
| $LiScS_2$ | 0.75 Li + 0.25 $LiScS_2$ => 0.5 $Li_2S$ + 0.25 Sc | 3 | 0.5335 | −0.133 | 0.6045 | 199.9768 |
| $Li_4MnGe_2S_7$ | 0.909 Li + 0.091 $Li_4MnGe_2S_7$ => 0.091 MnGe + 0.636 $Li_2S$ + 0.091 Ge | 9.989 | 1.7764 | −0.675 | 3.0682 | 183.1755 |
| $Li_4SnS_4$ | 0.167 Li4SnS4 + 0.833 Li => 0.167 LiSn + 0.667 Li2S | 4.988 | 0.8870 | −0.516 | 2.3454 | 166.7084 |
| $Li_2ZnSnS_4$ | 0.874 Li + 0.126 $Li_2ZnSnS_4$ => 0.021 $LiZn_3$ + 0.032 $Li_3(ZnSn_2)_2$ + 0.505 $Li_2S$ | 6.937 | 1.2336 | −0.639 | 2.9045 | 154.6333 |
| LiAuS | 0.667 Li + 0.333 LiAuS => 0.333 LiAu + 0.333 $Li_2S$ | 2.003 | 0.3562 | −0.585 | 2.6590 | 153.5049 |
| $Li_2MnSnS_4$ | 0.857 Li + 0.143 $Li_2MnSnS_4$ => 0.571 $Li_2S$ + 0.143 Sn + 0.143 Mn | 5.993 | 1.0658 | −0.663 | 3.0136 | 151.8409 |
| $Li_4GeS_4$ | 0.833 Li + 0.167 $Li_4GeS_4$ => 0.167 LiGe + 0.667 $Li_2S$ | 4.988 | 0.8870 | −0.503 | 2.2864 | 141.3301 |
| $Li_3SbS_3$ | 0.857 Li + 0.143 $Li_3SbS_3$ => 0.143 $Li_3Sb$ + 0.429 $Li_2S$ | 5.993 | 1.0658 | −0.621 | 2.8227 | 120.4473 |
| $LiInS_2$ | 0.75 Li + 0.25 $LiInS_2$ => 0.5 $Li_2S$ + 0.25 In | 3 | 0.5335 | −0.612 | 2.7818 | 109.9808 |
| $LiAl(PS_3)_2$ | 0.923 Li + 0.077 $LiAl(PS_3)_2$ => 0.077 LiP + 0.077 AlP + 0.462 $Li_2S$ | 11.987 | 2.1318 | −0.902 | 4.1 | 90.7327 |
| $LiGaS_2$ | 0.233 $LiGaS_2$ + 0.767 Li => 0.033 $Li_2Ga_7$ + 0.467 $Li_2S$ | 3.292 | 0.5855 | −0.571 | 2.5955 | 86.8207 |
| $LiZnPS_4$ | 0.111 $LiZnPS_4$ + 0.889 Li => 0.111 LiZnP + 0.444 $Li_2S$ | 8.009 | 1.4243 | −0.871 | 3.9590 | 84.3697 |
| $LiSbS_2$ | 0.857 Li + 0.143 $LiSbS_2$ => 0.143 $Li_3Sb$ + 0.286 $Li_2S$ | 5.993 | 1.0658 | −0.808 | 3.6727 | 79.8224 |
| $LiAlS_2$ | 0.75 Li + 0.25 $LiAlS_2$ => 0.5 $Li_2S$ + 0.25 Al | 3.00 | 0.5335 | −0.414 | 1.8818 | 79.6286 |

Stability against Moisture. It is also preferred that the sulfide coating material be stable against moisture to protect the highly reactive Li anode during processing and handling. Table 3 provides data with regard to moisture testing. Similar to Table 2, the above 18 sulfide coatings vs. $Al_2O_3$ in Table 3. For example, 0.5 $Al_2O_3$ reacts with 0.5$H_2O$ to form 1 $AlHO_2$ with $E_{rxn}$ of −0.024 eV/atom. The ratio between $H_2O$ to $Al_2O_3$ is 0.5/0.5=1. For $H_2O$ reaction, it is beneficial if the "Ratio" value of the coating is less compared to $H_2O$—$Al_2O_3$ reaction ratio (i.e., the sulfide coating consumes less $H_2O$). Similarly, it is desired for $E_{rxn}$ of $H_2O$ vs coating material reactions to be higher (i.e., less favorable to react with $H_2O$). The sum of these points is added and divided by molecular weight (similar to Table 2), and then a final $H_2O$ stability score is evaluated referenced to $Al_2O_3$. It has been found that the screened Li containing sulfide compounds have excellent stability against moisture and are better compare to the state-of-art $Al_2O_3$ coating, except for $LiZnPS_4$, $LiAl(PS_3)_2$, and $LiAlS_2$ which are sensitive to moisture and could lead to the formation of undesired $H_2S$. Therefore, these three compounds are eliminated from our screened list.

spans the anode operating voltage and overlaps with the electrochemical window of the electrolyte (electrochemical stability). The electrochemical stability window of a material, basically, is the voltage range (versus Li metal) in which the material is stable against decomposition by either Li consumption or release. Table 5 ranks the screened sulfides, based on the width of their electrochemical stability window. Sulfide coatings are relatively unstable at the operating

TABLE 3

Chemical stability against moisture.

| Compound | Reaction of Compound with Water | Ratio | Ratio vs $Al_2O_3$ | $E_{rxn}$ (ev/atom) | $E_{rxn}$ vs $Al_2O_3$ | $H_2O$ Stability Score |
|---|---|---|---|---|---|---|
| $Al_2O_3$ | $0.5\ Al_2O_3 + 0.5\ H_2O => AlHO_2$ | 1 | 1 | −9.208 | 1 | 100.00 |
| $Li_2S$ | NR | N/A | N/A | N/A | N/A | Excellent |
| $LiGaS_2$ | NR | N/A | N/A | N/A | N/A | Excellent |
| $Li_4GeS_4$ | NR | N/A | N/A | N/A | N/A | Excellent |
| $Li_3SbS_3$ | NR | N/A | N/A | N/A | N/A | Excellent |
| $Li_4SnS_4$ | NR | N/A | N/A | N/A | N/A | Excellent |
| $Li_2ZnSnS_4$ | NR | N/A | N/A | N/A | N/A | Excellent |
| $LiInS_2$ | NR | N/A | N/A | N/A | N/A | Excellent |
| $Li_3AuS_2$ | NR | N/A | N/A | N/A | N/A | Excellent |
| $Na_5Li_3(TiS_4)_2$ | NR | N/A | N/A | N/A | N/A | Excellent |
| $LiYS_2$ | NR | N/A | N/A | N/A | N/A | Excellent |
| $LiAuS$ | NR | N/A | N/A | N/A | N/A | Excellent |
| $LiScS_2$ | NR | N/A | N/A | N/A | N/A | Excellent |
| $Li_4MnGe_2S_7$ | NR | N/A | N/A | N/A | N/A | Excellent |
| $LiSbS_2$ | NR | N/A | N/A | N/A | N/A | Excellent |
| $Li_2MnSnS_4$ | NR | N/A | N/A | N/A | N/A | Excellent |
| $LiZnPS_4$ | $0.2\ LiZnPS_4 + 0.8\ H_2O => 0.2\ LiP(HO_2)_2 + 0.6\ H_2S + 0.2\ ZnS$ | 4 | 4 | −0.028 | 1.1667 | 87.9093 |
| $LiAl(PS_3)_2$ | $0.842\ H_2O + 0.158\ LiAl(PS_3)_2 => 0.007\ P_4S_7 + 0.02\ P_4S_3 + 0.158\ AlPO_4 + 0.842\ H_2S + 0.053\ Li_3PO_4$ | 5.329 | 5.329 | −0.065 | 2.7083 | 70.3499 |
| $LiAlS_2$ | $0.615\ H_2O + 0.385\ LiAlS_2 => 0.077\ LiAl_5O_8 + 0.462\ H_2S + 0.308\ LiHS$ | 1.597 | 1.597 | −0.056 | 2.3333 | 48.9348 |

Note:
NR indicates no reaction predicted, and the subsequent use of N/A indicates that because of NR, no data could be generated. Accordingly, this is desired and the $H_2O$ Score is indicated to be "excellent."

Analysis based on Electrochemical Performance: Ionic Conductivity and Electrochemical Window. The interfacial coating layer is ionically conductive under operating conditions, in order to reduce the interfacial resistance and the cell overpotential. Here, a machine learning model ("ML;" see Sendek et al., *Energy Environ. Sci.*, 2017, 10, 306-320 for the data used to train the model) is used to predict the ionic conductivity of the screened sulfide compounds. The rank of the screened sulfides based on the probability of their being a super-ionic conductor is shown in Table 4. As can be seen in Table 2, using a baseline interfacial coating material, such as $Al_2O_3$, in a sulfide-based solid-state battery system with Li metal anode results in the formation of lithiated phases such $Li_5AlO_4$ or $LiAlO_2$ at the interface. The predicted log (ionic conductivity) for $Li_5AlO_4$ or $LiAlO_2$ is −9.028 and −8.737 respectively. The predicted log (ionic conductivity) values of our screened sulfide coatings in Table 4 clearly shows that the screened sulfide coatings should have a comparable or better conductivity than the baseline metal oxide coating during operation.

An ideal anode-electrolyte interfacial coating material should also exhibit a wide electro-chemical window that voltages of a Li metal anode (as can also be seen in Table 5 that their reduction limit is generally greater than 1 V), but the phases (e.g., $Li_2S$, has a wide electrochemical window as illustrated in Table 5) that usually precipitate at the interface with Li (see Table 2) seem to allow them to cycle for long or "stabilize" in effect. Nonetheless, the sulfide coating can only be stable with the $Li_3PS_4$ electrolyte if its electrochemical window overlaps with that of the electrolyte to ensure that there is no driving force for Li transfer between the coating and the electrolyte. Given that the redox limits for sulfide electrolytes is typically is around 2 V, Table 5 illustrates that most of the screened sulfide coatings (except for $LiSbS_2$, $Li_3SbS_3$ and $Li_2MnSnS_4$) should be compatible with $Li_3PS_4$ electrolytes under battery cell operating conditions, because they have oxidation potentials of greater than 2.1 V with a window of about 1 V.

$LiSbS_2$ exhibits an oxidation potential of less than 2.1 V, and a low predicted ionic conductivity. Although $Li_2MnSnS_4$ and $Li_3SbS_3$ also have oxidation potentials very close to 2 V, their predicted ionic conductivity (see Table 4) is significantly higher. Likewise, $LiYS_2$ and $LiInS_2$ have relatively low predicted ionic conductivity compared to the other screened sulfides, but their oxidation potential and thereby the electrochemical stability with sulfide electrolytes is relatively high.

TABLE 4

Ionic conductivity predictions for screened sulfide coatings

| Compound | Predicted log(ionic conductivity, Scm$^{-1}$) |
|---|---|
| $Li_2ZnSnS_4$ | −2.4 |
| $Li_2MnSnS_4$ | −2.7 |
| $Li_3AuS_2$ | −3.4 |
| $LiScS_2$ | −5.1 |
| $Li_4GeS_4$ | −5.4 |
| $Li_4SnS_4$ | −5.5 |
| $Li_3SbS_3$ | −5.9 |
| $LiGaS_2$ | −6.4 |
| $LiAuS$ | −8.2 |
| $LiYS_2$ | −8.9 |
| $LiInS_2$ | −9.5 |
| $LiSbS_2$ | −10.0 |
| $Li_2S$ | −9.6 |

TABLE 5

Electrochemical Performance for screened sulfide coatings

| Compound | Oxidation potential | Window width |
|---|---|---|
| $Li_2S$ | 2.13 | 2.13 |
| $LiScS_2$ | 2.50 | 1.82 |
| $LiYS_2$ | 2.37 | 1.77 |
| $LiGaS_2$ | 2.64 | 1.33 |
| $LiInS_2$ | 2.58 | 1.16 |
| $Li_2ZnSnS_4$ | 2.38 | 0.71 |
| $Li_4GeS_4$ | 2.29 | 0.67 |
| $Li_4SnS_4$ | 2.22 | 0.50 |
| $Li_3AuS_2$ | 2.16 | 0.38 |
| $Li_2MnSnS_4$ | 2.0 | 0.35 |
| $LiAuS$ | 2.19 | 0.29 |
| $LiSbS_2$ | 2.06 | 0.28 |
| $Li_3SbS_3$ | 1.96 | 0.18 |

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochemical cell comprising:
a solid-state electrolyte;
an anode; and
an interfacial layer between the solid-state electrolyte and the anode;
wherein the interfacial layer comprises a lithium metal sulfide that comprises $LiScS_2$.

2. The electrochemical cell of claim 1, wherein the solid-state electrolyte comprises $Li_3PS_4$, $Li_7P_3S_{11}$, $Li_2SP_2S_5$, or $Li_6PS_5Cl$.

3. The electrochemical cell of claim 1, wherein the anode comprises a lithium metal foil, a copper metal foil; or a combination thereof.

4. A solid-state battery comprising:
a cathode; and
a lithium metal sulfide separating an anode and a solid-state electrolyte;
wherein the lithium metal sulfide comprises $LiScS_2$.

5. The solid-state battery of claim 4, wherein the solid-state electrolyte comprises $Li_3PS_4$, $Li_7P_3S_{11}$, $Li_2SP_2S_5$, or $Li_6PS_5Cl$.

6. The solid-state battery of claim 4, wherein the anode comprises a lithium metal foil, a copper metal foil; or a combination thereof.

7. The solid-state battery of claim 6, wherein the anode comprises a lithium metal foil and the lithium metal sulfide is formed as a coating on the lithium metal foil.

8. The electrochemical cell of claim 3, wherein the anode comprises a lithium metal foil and the interfacial layer is a coating on the lithium metal foil.

9. The electrochemical cell of claim 1, wherein the solid-state electrolyte consists of $Li_3PS_4$, $Li_7P_3S_{11}$, $Li_2SP_2S_5$, or $Li_6PS_5Cl$.

10. A solid-state battery pack comprising a plurality of solid state batteries, each solid state battery comprising:
   a cathode; and
   a lithium metal sulfide separating an anode and a solid-state electrolyte;
   wherein the lithium metal sulfide comprises $LiScS_2$.

11. The solid-state battery pack of claim 10, wherein the solid-state electrolyte comprises $Li_3PS_4$, $Li_7P_3S_{11}$, $Li_2SP_2S_5$, or $Li_6PS_5Cl$.

12. The solid-state battery pack of claim 10, wherein the anode comprises a lithium metal foil, a copper metal foil; or a combination thereof.

13. The solid-state battery of claim 6, wherein the anode comprises a lithium metal foil and the lithium metal sulfide is formed as a coating on the lithium metal foil.

14. The solid-state battery of claim 10, wherein the solid-state electrolyte consists of $Li_3PS_4$, $Li_7P_3S_{11}$, $Li_2SP_2S_5$, or $Li_6PS_5Cl$.

15. The solid-state battery of claim 4, wherein the cathode comprises a lithium nickel manganese cobalt oxide, a lithium iron phosphate, or lithium cobalt oxide.

16. The solid-state battery pack of claim 10, wherein the cathode comprises a lithium nickel manganese cobalt oxide, a lithium iron phosphate, or lithium cobalt oxide.

* * * * *